United States Patent
Berg et al.

(10) Patent No.: US 7,562,342 B2
(45) Date of Patent: Jul. 14, 2009

(54) METHOD AND APPARATUS FOR INCREMENTALLY PROCESSING PROGRAM ANNOTATIONS

(75) Inventors: Daniel Christopher Berg, Cary, NC (US); Jean-Sebastien Michel Delfino, San Carlos, CA (US); Narinder Makin, Morrisville, NC (US); Lawrence Scott Rich, Cary, NC (US); Ritchard Leonard Schacher, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 11/002,845

(22) Filed: Dec. 2, 2004

(65) Prior Publication Data
US 2006/0123332 A1   Jun. 8, 2006

(51) Int. Cl.
G06F 9/44 (2006.01)
G06F 9/45 (2006.01)

(52) U.S. Cl. .................. 717/108; 717/104; 717/110; 717/115; 717/122; 717/143

(58) Field of Classification Search .................. None
See application file for complete search history.

(56) References Cited

U.S. PATENT DOCUMENTS

| | | | |
|---|---|---|---|
| 5,446,886 A | 8/1995 | Li | |
| 5,721,900 A | 2/1998 | Banning et al. | |
| 6,341,277 B1 | 1/2002 | Coden et al. | |
| 6,574,639 B2 | 6/2003 | Carey et al. | |
| 6,609,123 B1 | 8/2003 | Cazemier et al. | |
| 6,618,732 B1 | 9/2003 | White et al. | |
| 6,690,820 B2 | 2/2004 | Lees et al. | |
| 6,850,927 B1 | 2/2005 | Hsu | |
| 6,957,214 B2 | 10/2005 | Silberberg et al. | |
| 7,222,333 B1 * | 5/2007 | Mor et al. ................. | 717/115 |
| 2004/0015506 A1 | 1/2004 | Anonsen et al. | |
| 2005/0066338 A1 | 3/2005 | Bloesch et al. | |
| 2006/0061595 A1 | 3/2006 | Goede et al. | |
| 2007/0192336 A1 | 8/2007 | Iyer et al. | |

OTHER PUBLICATIONS

Berg et al., Method and Apparatus for Annotation-Based Behavior Extensions, Dec. 2, 2004.
Berg et al., Mechanism for Defining Queries in Terms of Data Objects, Dec. 2, 2004.
Berg et al., Method and Apparatus for Generating a Service Data Object Based Service Pattern for an Enterprise Java Beans Model, Dec. 2, 2004.

* cited by examiner

*Primary Examiner*—Chuck O Kendall
(74) *Attorney, Agent, or Firm*—Yee and Associates

(57) ABSTRACT

A method and system for incrementally processing program annotations is provided. A source model, a doclet model and a semantic model are used to represent and transform annotations incrementally. The source model represents actual types, fields, and methods that contain annotations. The doclet model includes doclet objects representing tags and attributes for a type, field, and method for a given namespace. Tag handlers registered for the given namespace detect changes in annotations and create or update doclet objects based on the changes. Changes in the doclet model are then transformed into the semantic model and may be persisted for restoration.

43 Claims, 11 Drawing Sheets

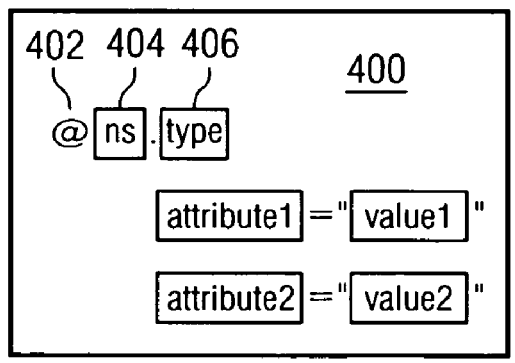

```
/**
*This is the Account entity bean. It is an example of how to use the
*EJBDoclet tags.
*
*@see Customer
*
*@ejb.bean
*    name="bank/Account"
*    type="CMP"
*    jndi-name="ejb/bank/Account"
*    local-jndi-name="ejb/bank/LocalAccount"
*    primkey-field="id"
*
*@ejb.finder
*    signature="java.util.Collection findAll()"
*    unchecked="true"
*
*@ejb.transaction
*    type="Required"
*
*@ejb.interface
*    remote-class="test.interfaces.Account"
*
*@ejb.value-object
*    match="*"
*
*@version 1.5
*/
```

*FIG. 4*

```
package ejbs;
import javax.ejb.SessionBean;
import javax.ejb.SessionContext;
import javax.ejb.CreateException;
/**
 * Bean implementation class for Session Bean: LoginService
 * @ejb.bean
 *     name="LoginService"
 *     type="Stateless"
 *     jndi-name="ejb/ejbs/LoginServiceHome"
 *     view-type="remote"
 *     transaction-type="Container"
 * @ejb.home
 *     remote-class="ejbs.LoginServiceHome"
 *
 * @ejb.interface
 *     remote-class="ejbs.LoginService"
 */
public class LoginServiceBean implements SessionBean {
        private SessionContext mySessionCtx;
        /**
         * getSessionContext
         */
        public SessionContext getSessionContext() {
                return mySessionCtx;
        }
        /**
         * setSessionContext
         */
        public void setSessionContext(SessionContext ctx) {
                mySessionCtx = ctx;
        }
        /**
         * ejbCreate
         */
        public void ejbCreate() throws CreateException {
        }
        /**
         * ejbActivate
         */
        public void ejbActivate() {
        }
        /**
         * ejbPassivate
         */
        public void ejbPassivate() {
        }
        /**
         * ejbRemove
         */
        public void ejbRemove() {
        }
        /**
         * @ejb.interface-method
         * @ejb.service-method
         * @param userId
         * @param password
         */
        public void login(String userId, String password) {
                //TODO Add login logic.
        }
}
```

FIG. 8

Labels: 802 (@ejb.bean block), 804 (@ejb.home block), 806 (@ejb.interface block), 807 (@ejb.interface-method), 808 (@ejb.service-method), 810 (jndi-name line), 812 (name="LoginService"), 814 (public void login block), 800 (overall figure)

METHOD AND APPARATUS FOR INCREMENTALLY PROCESSING PROGRAM ANNOTATIONS

CROSS REFERENCE TO RELATED APPLICATIONS

The present invention is related to the following applications entitled Method and Apparatus for Annotation-Based Behavior Extensions, Ser. No. 11/002,833 filed on Dec. 2, 2004; Mechanism for Defining Queries in Terms of Data Objects, Ser. No. 11/001,864 filed on Dec. 2, 2004. Method and Apparatus for Generating a Service Data Object Based Service Pattern for an Enterprise Java Beans Model, Ser. No. 11/001,864 filed on Dec. 2, 2004. All of the above related applications are assigned to the same assignee, and incorporated herein by reference.

BACKGROUND OF THE INVENTION

1. Technical Field

The present invention relates to an improved data processing system. In particular, the present invention relates to processing program annotations in a data processing system. Still more particularly, the present invention relates to incrementally processing program annotations by changing the program's source, doclet, and semantic model.

2. Description of Related Art

In modern development environment, programmers may use annotations declared in a source program to generate auxiliary artifacts or files that perform services. Many common services, including home, remote interfaces and deployment descriptors of an enterprise Java™ Bean, can be automatically generated by a development tool or at run time using annotations.

In most development environments, an annotation is a comment declared in a source program that is preceded with a '@' symbol. By using annotations, metadata may be associated with program elements such as classes, methods, fields, parameters, local variables, and packages. For some programming languages, annotations are compiled and the metadata is stored in the class files. For other programming languages, annotations are interpreted and processed by an annotation processor. Later, the virtual machine or other programs can look for the metadata to determine how to interact with the program elements or change their behavior.

Currently, existing development tools that support annotation processing and artifact generation, such as Ant, an open source product available from the Apache Software Foundation, or XDoclet, an open source product available from XDoclet team of the Apache Software Foundation, process all annotations at once and generate all artifacts at the same time. In order to process all the annotations within a collection of source files and generate artifacts, a programmer has to run a script to start the processing. This slows development productivity, since the programmer has to manually run the script each time to process the annotations.

Other development tools allow programmers to set up automatic scripts that are invoked when a source program is modified. However, the entire collection of source files is processed and all auxiliary artifacts are generated regardless of any source file changes. While mechanisms that process only the changed annotated source files are available, all of the artifacts are still generated even though none of annotations in the source files changes. This greatly affects development performance, because generation of the artifacts is performed regardless of any annotation changes.

Therefore, it would be advantageous to have an improved method and apparatus that incrementally processes annotation changes and generates artifacts for a collection of source files, such that generation of artifacts is processed only when the annotation in the source files changes.

BRIEF SUMMARY OF THE INVENTION

A method, apparatus and computer instructions is provided for incrementally processing program annotations in a data processing system. The mechanism of the present invention provides three internal models: source model, doclet model, and semantic model. When annotations are processed, the mechanism of the present invention detects added, removed, or changed annotations in source files. A tag handler registered for a given namespace creates or updates doclet objects in the doclet model and associates them with corresponding source elements in the source model. Once all source files are processed, an annotation model transformer and a model content handler are used to transform changes in the doclet model to the semantic model.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram illustrating an exemplary annotation in accordance with a preferred embodiment of the present invention;

FIG. 8 is a diagram illustrating an exemplary Java™ source file with program annotations in accordance with a preferred embodiment of the present invention;

DETAILED DESCRIPTION OF THE INVENTION

Figure 1:
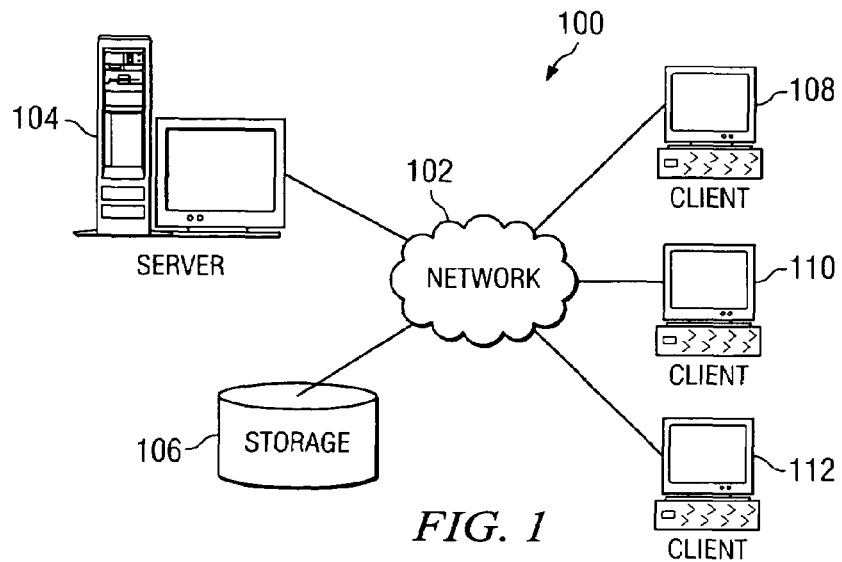
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
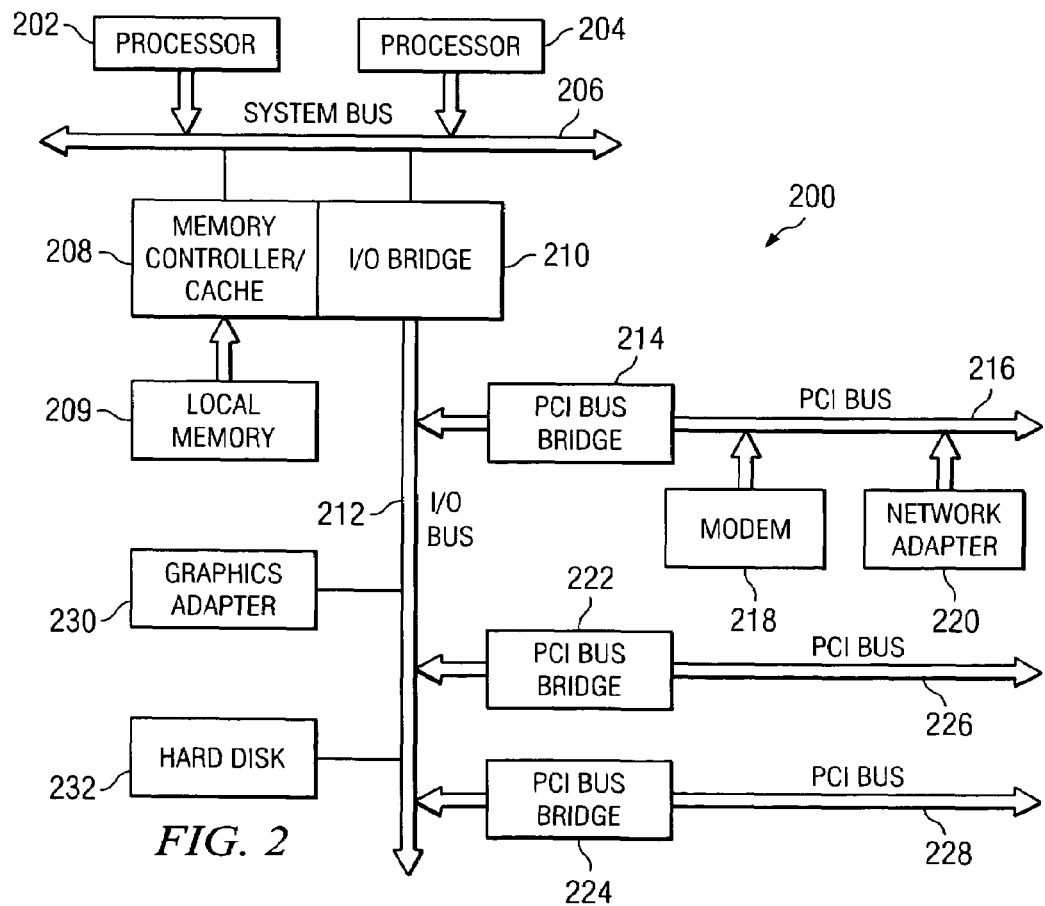
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
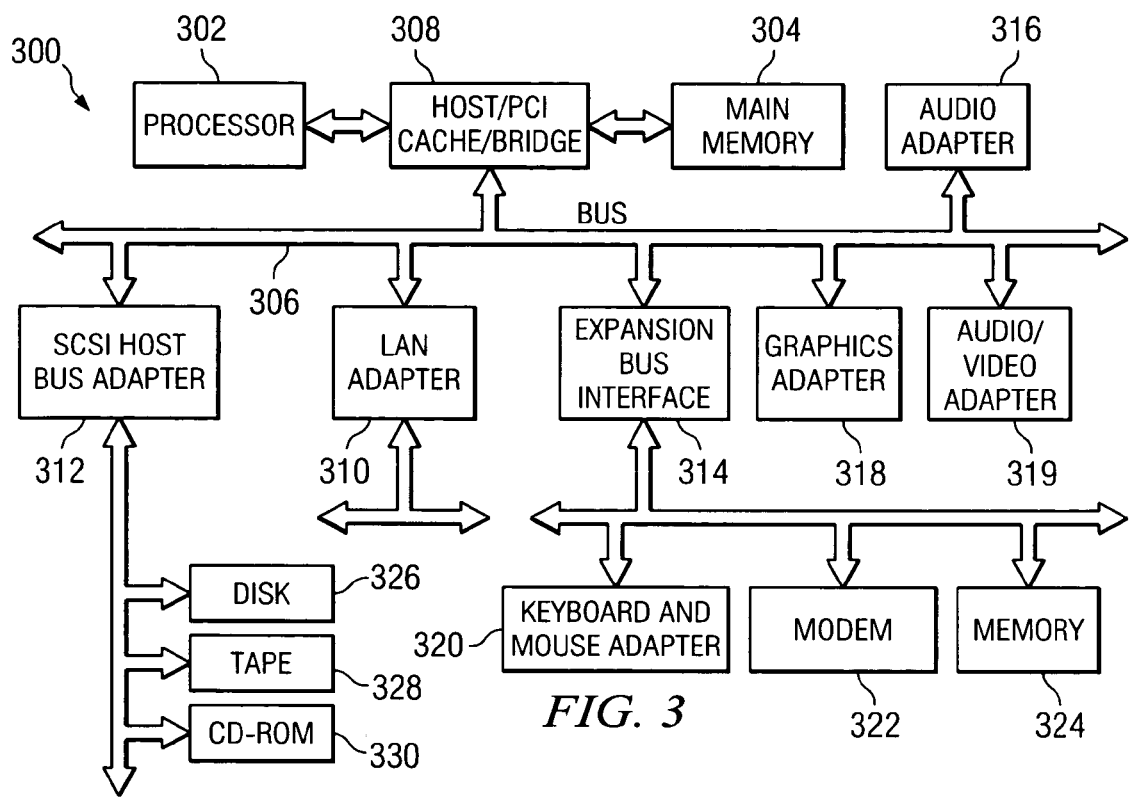
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java™ may run in conjunction with the operating system and provide calls to the operating system from Java™ programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus and computer instructions for incrementally processing program annotations. The mechanism of the present invention processes annotations in a source file incrementally by using three internal models in these examples. In a preferred embodiment,these models include a source model, a doclet model, and a semantic model. These models also include instances and corresponding meta-model. A source model represents actual classes, fields, and methods that contain annotations. Each of these members includes one or more annotation objects. In an alternative embodiment, the source model and the semantic model may be combined to form a single meta model and corresponding instances.

The doclet model represents valid tags and attributes for types, fields, and methods within the source file for a given namespace. The doclet model is a flat model, which is a model that provides a one-to-one mapping of tags and values that are depicted in the source file, and does not necessarily represent application objects. The semantic model represents a working model within the system. Changes in the doclet model are transformed by the mechanism of the present invention into the semantic model.

When a user makes changes to annotations in a source file and initiates a build in the system, the build tool initiates necessary builders to process the changed source files. An example of a necessary builder includes an annotation processor, which processes annotations within the changed source files. The annotation processor includes tag handlers that are registered against a given tag namespace. The annotation processor in turn notifies tag handlers that are registered with a given namespace to start recording changes to a doclet model. A doclet model is a model that is generated and updated dynamically by a tag handler as annotations are processed in the source file.

When the annotation processor processes each changed source file, each annotation is processed by each tag handler registered for the given namespace of the annotation. The tag handler either locates or creates a modeled source element, which is an in-memory representation of an actual Java™ type, method, or field. Once the model sourceelement is located or created, the model source element object is used to store doclet object instances that are created from the annotations.

From a modeled source element, an annotation object is either located or created. An annotation object is a container for annotations that are processed by a given tag handler. For a given modeled source element, one or more annotation objects may be present, since more than one annotation tag belonging to multiple namespaces can be set.

Each annotation object processed by the given tag handler is added to the tag handler's annotation change recorder, such that changes to the annotation and its contents may be tracked. If an annotation object is not located, a new annotation object is created by associating a unique id, such as a tag handler key, identifying a specific tag handler. The annotation object may then be added to the modeled source element.

At this point, validations, such as syntax and programmatic validations, may be performed to exclude non-conforming or bad annotation tag data. After the annotation tag data is validated, the mechanism of the present invention processes the annotation tag data into a doclet model instance object. If validation fails, the mechanism of the present invention does not process the annotation into the doclet model.

When annotation tag data is processed, the annotation tag data, which includes associated attributes and values, is sent to the tag handler registered for the given namespace of the annotation tag data. An existing doclet object instance is then located based on the region in which the annotation is detected in the source file, for example, type, field, or method.

In order to locate an existing doclet object instance, a region object is first located from the annotation object corresponding to the annotation tag data. Only one region object may be present for each annotation object. After the region object is located, an existing doclet object instance is located from the region object based on its multiplicity in the doclet meta-model with a property that has the same name as the tag name.

If more than one existing doclet object instance is present in the doclet meta-model that has the same name as the tag name, the tag handler may define a unique property for the given doclet meta-model type, for example, a name, and an existing doclet object instance may be located based on the unique property. Another way to locate an existing doclet object instance is to detect the existing doclet object instance based on the position of the annotation in the source file. For example, if the annotation is the second annotation within the region with the same tag name, the existing doclet object instance may be the second object in the list of doclet object instances of the doclet region object with the same tag name.

If an existing doclet object instance is not located, a new doclet object instance may be created by first creating a region object in the meta-model for the given tag name and namespace if the region object does not already exist. Next, the newly created region object may be added to the annotation object corresponding to the annotation tag data. From the region object, a property with the same tag name is located and a new doclet model object instance may be created using the type of the property and added to the region object using the property. At this point, a range of the annotation in the source is cached with the doclet object, such that when a semantic validation problem is detected, the annotation may be easily identified from a doclet object in order to place error or warning message markers in the source file.

After the existing doclet object instance is located or created, tag attributes and values are processed for the given tag. In order to process the tag attributes and values, the mechanism of the present invention locates a property on the existing doclet object instance that has the same name as the tag attribute being processed. If a property with the same name is located, the value of the property is set with the value of the tag attribute being processed.

Once all annotation tag data is processed for a given source file, the mechanism of the present invention processes the next changed source file until all changed source files are processed. After processing is complete, the annotation processor then notifies each tag handler that the end of the build step has been reached.

Accordingly, each tag handler traverses each annotated source file and uses the annotation change recorder to determine which of the doclet objects and attributes have not been processed. If a doclet object and its attributes are not processed, the annotation property or tag no longer exists in the source file. For the doclet objects and attributes that are not processed, corresponding doclet objects and doclet attribute values are removed from the doclet model.

However, if source files that have annotations are deleted, all doclet model objects corresponding to deleted source files are removed from the in memory annotation source model. In this way, the doclet model reflects the exact same tags and tag attributes as described in the source files.

After removing non-processed and deleted doclet objects, each tag handler issues an end recording call to the annotation change recorder. The recorder then processes the changes and determines which doclet objects are deleted and which doclet objects are changed. Doclet objects that are changed with the same values are removed from the changed objects list.

If at least one doclet object is added, removed, or changed, then at least one doclet object is transformed into the semantic model, which is a working model of the system that is typically used for artifact generation. The semantic model consists of an arrangement of data from the doclet model into a more meaningful form that can be used for display, code generation, validations, etc. The transformation is performed by a model content handler, which is created by the tag handler. The annotation model transformer is invoked by the tag handler passing the annotation change recorder and the model content handler to process the changes to the doclet model.

To transform doclet objects, a specialized model content handler is created by a tag handler when a transform method is invoked on the transformer. The transformer then sets the state of the model content handler to 'ADDED'. The state is set to ensure that event notifications of doclet objects are handled appropriately.

Next, the transformer retrieves a list of added doclet objects from the annotation change recorder. The transformer then iterates the list of objects and sends an event with the added object to the model content handler.

Since each model content handler is specific to a given tag set or namespace, the processing of the doclet object in the event is flexible. Depending on the modification, the model content handler may add, remove, or change objects in the semantic model.

The transformer creates a link between the doclet object being handled and any created semantic object in the semantic model returned by the model content handler. The link provides a programmatic way to navigate from the semantic objects to the doclet objects and from the doclet objects to the semantic objects. In a preferred embodiment, a link may be created by adding an adapter to the semantic object and retrieving the corresponding doclet object from the adapter for the semantic object.

The model content handler may perform semantic validations on the objects being processed. If an error or warning occurs, the doclet object may be derived from the semantic object using the link and the annotation tag data may in turn be derived using the cached source range.

By identifying the annotation tag data, a host integrated development environment (IDE) may place a marker in the source code to indicate the error or warning. If changes are made in the semantic model, they are recorded for future processing by the tag handler. The tag handler uses this information to generate, remove, or update code or other internal models as necessary.

When transforming doclet objects, doclet objects that cannot be processed until other doclet objects are processed may be deferred using a deferred linker, which is a block of executable code that is handled after all the doclet objects are processed.

Once the list of added objects is transformed, the transformer performs similar steps to set the state of the model content handler to 'REMOVED' and transform a list of removed objects to remove semantic objects from the semantic model. After the list of removed objects is transformed, a list of changed objects is transformed in a similar manner by the transformer. The transformer first sets the state of the model content handler to 'CHANGED' and then processes a list of changed objects to change the semantic objects in the semantic model.

Finally, the transformer processes deferred objects in each deferred linker by invoking its run method. After transformation is complete, the transformer notifies the model content handler that the end of doclet object processing has been reached. The model content handler may perform any final processing or validations, such as searching for dangling references, marking of generation artifacts as 'dirty' due to model changes or any other semantic validations.

Once all tag handlers are called to process the annotations, the mechanism of the present invention determines if any doclet model is changed during processing of the annotations. If any doclet model is changed, the source model and a linking model that links doclet objects with semantic objects are serialized out to an integrated development environment state location in a serialization format, such as an extensible markup language (XML) metadata interchange (XMI) format. In this way, all three models may be persisted after annotation changes are processed and the complete annotation state may be restored when the development environment is shutdown or restarted.

Turning now to FIG. 4, a diagram illustrating an exemplary annotation is depicted in accordance with a preferred embodiment of the present invention. As depicted in FIG. 4, in this example implementation, annotation 400 begins with a '@' symbol 402. However, other symbol, tags, or identifiers may be used to denote annotation 400. After the '@' symbol 402, namespace 404 or tag set is defined, followed by type 406. Namespace 404 defines the scope in which annotation 400 operates within the entire module or program. Type 406 defines a name for annotation 400 in namespace 404.

Annotation 400 also includes a number of attribute-value pairs, for example, attribute 1 and value 1. Attribute 1 is a property of type 406, such as name 408 of an enterprise Java™ bean or type 410 of an enterprise Java™ bean. Value 1 defines the value corresponding to attribute 1, for example, "bank/Account" 412 as the name of the enterprise Java™ bean or "CMP" 414 as the type of the enterprise Java™ bean.

Figure 5:
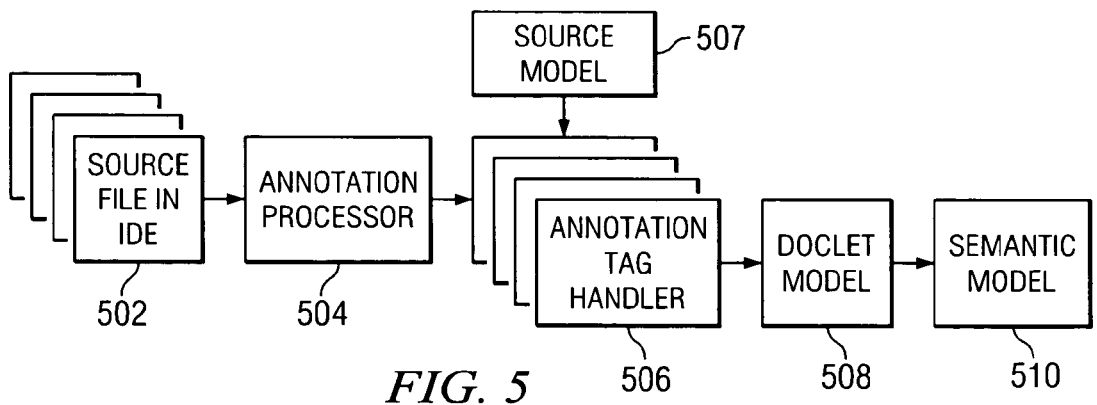
FIG. 5 is a diagram illustrating an exemplary flow for incrementally processing program annotations in accordance with a preferred embodiment of the present invention.

Turning now to FIG. 5, a diagram illustrating an exemplary flow for incrementally processing program annotations is depicted in accordance with a preferred embodiment of the present invention. As shown in FIG. 5, in this example implementation, one or more source files 502 may be defined in an integrated development environment (IDE), such as Rational Application Developer, a product available from International Business Machines Corporation. The integrated development environment may be implemented in a data processing system, such as data processing system 200 in FIG. 2 or data processing system 300 in FIG. 3.

Within each source file, annotations, such as annotation 400 in FIG. 4, may be defined to specify artifacts or behaviors to be generated at run time. When a user initiates a build in the IDE, annotation processor 504 processes source files 502 by parsing the annotations within a changed source file and calls registered annotation tag handlers 506 based on the namespace of the annotations. Each of the registered annotation tag handlers 506 corresponds to a particular namespace or tag set.

When annotation tag handler 506 receives a request to process changes, it initiates recording of changes using an annotation change recorder. Annotation tag handler 506 then retrieves or creates a modeled source element, such as a source type, field, or method, in source model 507. Source model 507 represents an in memory representation of actual Java™ types, fields or methods that contain annotations.

Annotation tag handler 506 also creates or updates doclet model object in doclet model 508 for the given annotation tag and associates the doclet model object with the modeled source element. Doclet model 508 includes doclet objects that are either created or updated by annotation tag handlers 506 during processing of annotations. Doclet objects represent valid annotation tags and associated attributes for a type, field, or method of a given namespace.

Once all changed source files are processed, annotation tag handler 506 notifies the annotation change recorder to stop recording and determines if any changes are made to doclet model 508. If changes are made, annotation tag handler 506 invokes an annotation model transformer to transform each added, removed, and changed doclet object into semantic model 510. The transformation is performed using a model content handler, which is invoked by the transformer as the transformer iterates each added, removed, and changed doclet object and records the changes to semantic objects in semantic model 510 accordingly.

Figure 6:
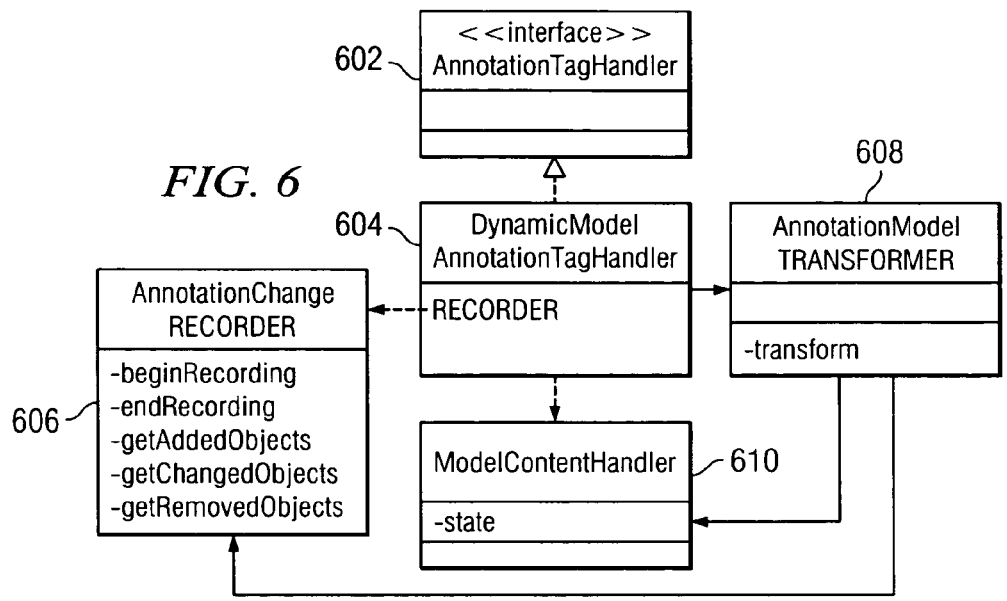
FIG. 6 is a diagram illustrating relationships between components for incrementally processing program annotations in accordance with a preferred embodiment of the present invention.

Turning now to FIG. 6, a diagram illustrating relationships between components for incrementally processing program annotations is depicted in accordance with a preferred embodiment of the present invention. As depicted in FIG. 6, in this example implementation, dynamic model annotation tag handler 604 implements interface annotation tag handler 602 to handle annotations. Dynamic model annotation tag handler 604 is called during run time by annotation processor to process annotations of a given namespace.

In turn, dynamic model annotation tag handler 604 uses annotation change recorder 606 to record changes to the doclet model during processing of changed source files. After all changed source files are processed, annotation change recorder stops recording and determines if any changes are made to the doclet model.

If changes are made to the doclet model, dynamic model annotation tag handler 604 calls a transform method on annotation model transformer 608 to transform doclet model object changes to the semantic model. Annotation model transformer 608 iterates changed doclet objects from annotation change recorder 606 and sends events to model content handler 610 containing the changed doclet object. Model content handler 610 creates a semantic object and adds it to the semantic model if the state is 'ADDED'. Model content handler 610 returns the new semantic object to transformer 608 which will then link the semantic object to the doclet object. If the state is 'REMOVED,' model content handler 610 performs deletion of the semantic object based on the link. If the state is 'CHANGED,' model content handler 610 performs updates to the semantic object based on the link. In addition to transforming doclet model object changes to the semantic model based on a state, model content handler 610 may transform changes to the semantic model based on other events as notified by annotation model transformer 608. Furthermore, the correlation between the doclet model and the semantic model is not necessarily a one-to-one relationship. Thus, a 'ADDED' state may result in updates to an existing semantic object.

After transformation is complete, model content handler 610 may perform final processing on the semantic model, for example, validations and searches for dangling references. After final processing is performed, dynamic model annotation tag handler 604 may perform other updates, such as generation of code, based on changes to the semantic model.

Figure 7:
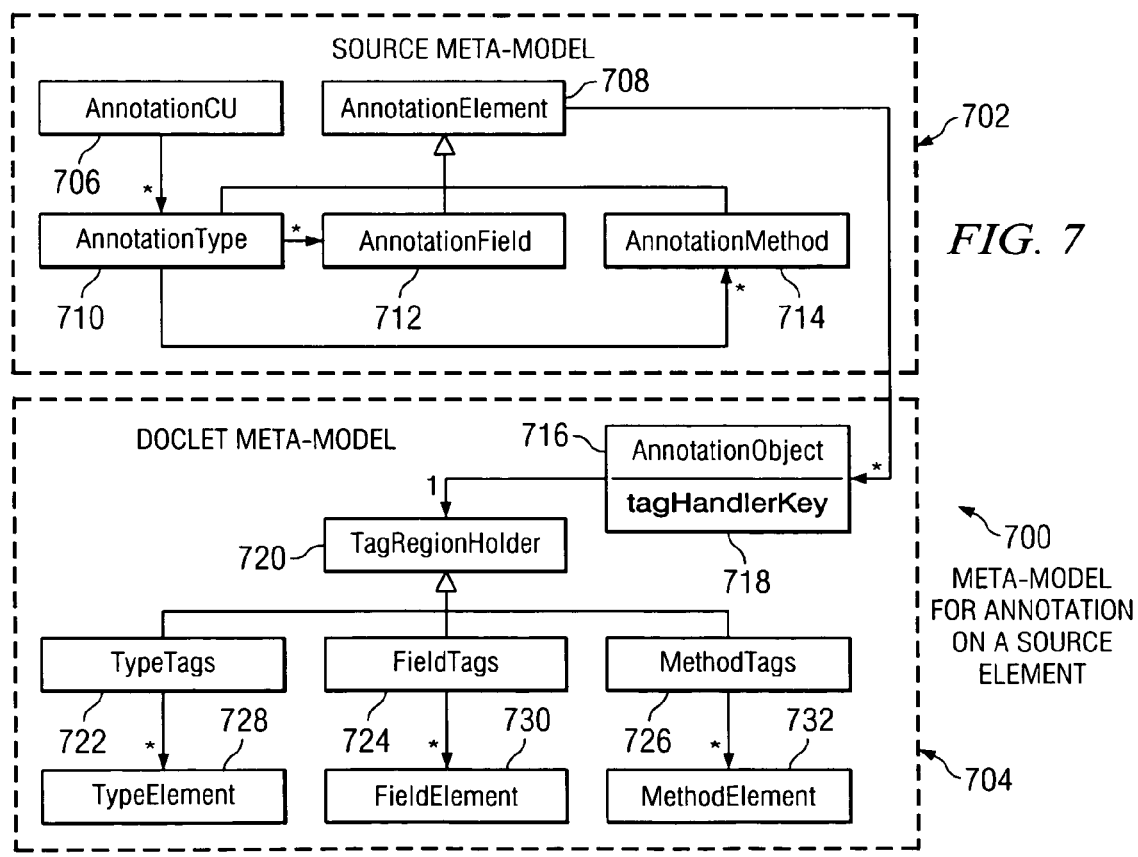
FIG. 7 is a diagram illustrating an exemplary meta-model for annotation on a source element in accordance with a preferred embodiment of the present invention.

Turning now to FIG. 7, a diagram illustrating an exemplary meta-model for annotation on a source element is depicted in accordance with a preferred embodiment of the present invention. As depicted in FIG. 7, in this example implementation, meta-model 700 includes source model 702 and doclet model 704. Source model 702 includes annotation compilation unit (CU) 706, which represents a Java™ source file.

Annotation compilation unit 706 has one or more annotation types 710, which are known as annotation elements 708. Annotation elements 708 may be annotation types 710, annotation fields 712, or annotation methods 714. Annotation type 710 may include zero or more annotation fields 712 and zero or more annotation methods 714.

For each annotation element 708, whether it is annotation type, annotation field, or annotation method, one or more corresponding annotation objects 716 may be present. An annotation object is a container for doclet model elements from a given tag handler. Multiple annotation objects 716 may be present for a given source annotation element 708, since there may be more than one tag handler for a given annotation namespace or there may be multiple annotation tags from different namespaces for a given annotation element. Thus, each annotation object may be contributed to by different annotation tag handlers. In addition, annotation object 716 has an associated tag handler key 718, which is a key that identifies a specific tag handler that handles the annotation. Thus, each annotation object 716 is associated with a different tag handler.

For each annotation object 716, only one corresponding tag region holder 720 is present, which may either be a type tag 722, a field tag 724, or a method tag 726. Tag region holder 720 defines the region in which the annotation tag belongs. For example, an annotation tag that defines a bean type may belong to a type tag region 722. An annotation tag that defines a method may belong to a method tag region 726.

For each tag region holder, one or more corresponding elements or doclet meta-model objects may be present. These doclet meta-model objects include type element 728, field element 730, and method element 732. These doclet element meta-model objects are unique to the doclet meta-model described for the tag set. Each element represents the type of annotation and includes corresponding attributes and values.

In this example, annotation objects 716, tag region holder 720, type tags 722 and elements 728, field tags 724 and elements 730, and method tags 726 and elements 732 all belong to doclet model 704. In this way, the doclet objects may be created or updated as annotations are processed by tag handlers.

The description in FIG. 7 has been presented for purposes of illustration and description, and is not intended to be exhaustive or limited to the invention in the form disclosed. Thus, the present invention is not limited to using a specific set of meta-models for the source and annotations or doclets. Many modifications and variations will be apparent to those of ordinary skill in the art. For example, JSR-000175, a specification for metadata facility for the Java™ Programming Language, available from Sun Microsystems, Inc., may be used instead of the meta-models described in FIG. 7.

Turning now to FIG. 8, a diagram illustrating an exemplary Java™ source file with program annotations is depicted in accordance with a preferred embodiment of the present invention. As depicted in FIG. 8, Java™ source file or LoginService.java 800 includes annotations 802-808. Annotation 802 belongs to namespace 'ejb' and has a type of 'bean'. Within annotation 802, a number of attributes and corresponding values are specified. For example, attribute 'name' 810 is specified with a value of "LoginService" 812.

Similarly, annotation 804 belongs to the same namespace, 'ejb,' and has a type of 'home,' which defines a home interface class. Annotation 806 belongs to the same namespace, 'ejb,' and has a type of 'interface,' which defines a remote interface class.

Annotation 807 also belongs to the same 'ejb' namespace and has a type of 'interface-method', while annotation 808 belongs to the same namespace and has a type of 'service-method.' Annotation 807 defines an interface method and annotation 808 defines a service method. Both annotations 807 and 808 refer to login method 814.

Figure 9:
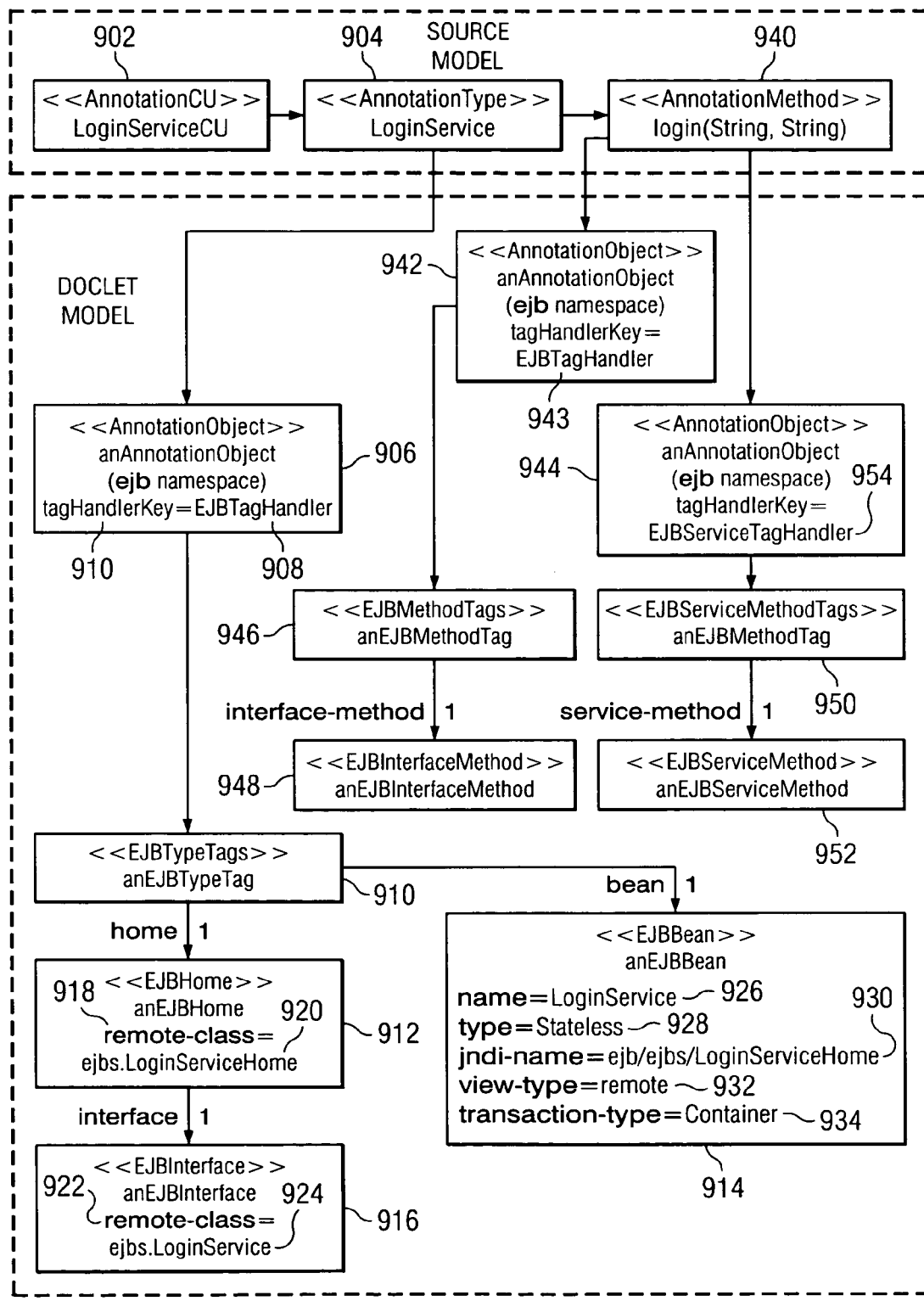
FIG. 9 is a diagram illustrating an exemplary doclet model and source model instances for LoginService.java file 800 in FIG. 8 in according to a preferred embodiment of the present invention.

Turning now to FIG. 9, a diagram illustrating exemplary doclet model and source model instances for LoginService.java file 800 in FIG. 8 is depicted in accordance with a preferred embodiment of the present invention. As depicted in FIG. 9, in this example implementation, annotation compilation unit (CU) 902 represents LoginService.java file 800 in FIG. 8. 'LoginService' 904 is an annotation type, which has a unique id that provides a handle to the actual Java™ type.

'LoginService' 904 includes annotation object 906. Annotation object 906 is created in the doclet model by a tag handler, such as EJBTagHandler 908 which is registered against the 'ejb' namespace. Annotation object 906 holds doclet objects for annotation type 'LoginService' 904 for this given tag handler. Tag handler key 910 provides a mechanism to track which tag handler contributes which doclet objects to the source model elements.

For annotation object 906, a tag region holder or EJBTypeTags 910 is defined. EJBTypeTags 910 is a model used to define all annotations that are available for a Java type, at the level of the type declaration, within the 'ejb' namespace. EJBTypeTags 910 includes a 'home' relationship with a multiplicity of one and a type of EJBHome 912. This means that there can only be one annotation tag 804 with the name 'home' in the 'ejb' namespace for a given Java type.

EJBTypeTags 910 also has a 'bean' relationship with a multiplicity of one and a type of EJBBean 914. This means that there can only be one annotation tag 802 with the name 'bean' in the 'ejb' namespace for a given Java type.

EJBTypeTags has an 'interface' relationship with a multiplicity of one and a type of EJBInterface 916. This means that there can only be one annotation tag 806 with the name 'interface' in the 'ejb' namespace for a given Java type.

EJBHome element 912 is the doclet model type that represents annotation 804 in FIG. 8 and includes attribute 'remote-class' 918. Attribute 'remote-class' 918 defines a fully qualified name of the home interface class 'ejbs.LoginServiceHome' 920.

EJBInterface element 916 is the doclet model type that represents annotation 806 in FIG. 8 and also includes attribute 'remote-class' 922. Attribute 'remote-class' 922 defines a fully qualified name of the remote interface class 'ejbs.LoginService' 924.

EJBBean element 914 is the doclet model type that represents annotation 802 in FIG. 8 and includes a number of attributes, including name 926, type 928, jndi-name 930, view-type 932, and transaction-type 934. Each of these attributes defines a property of the enterprise Java™ bean. For example, name 926 defines the name of the enterprise Java™ bean, in this example, 'LoginService.' Type 928 defines the type of the enterprise Java™ bean, in this example, 'Stateless.'

In addition to annotation object 906, annotation type 'LoginService' 904 also includes annotation method 'login (String, String)' 940, which represents login method 814 in FIG. 8. Annotation method 'login(String, String)' 940 is referred to by two annotations, annotations 807 and 808 in FIG. 8. In this case there are two corresponding annotation objects, annotation objects 942 and 944, because there are two separate annotation tag handlers that are both registered against the 'ejb' namespace but handle different tags, as shown by the different values for the tagHandlerKeys 943 and 954. In the present invention, annotation objects are used to isolate doclet objects on source model elements from different annotation tag handlers.

Annotation object 942 has the same tag handler key as annotation object 906, which is EJBTagHandler 943. However, unlike annotation object 906, annotation object 942 defines a tag region holder of EJBMethodTag 946, instead of EJBTypeTags 910, since there are different tags and doclet model objects available on methods than types. EJBMethodTag 946 has a relationship named 'interface-method' of type EJBInterfaceMethod 948. This relationship has a multiplicity of one which indicates that there can only be one annotation tag named 'interface-method' in the 'ejb' namespace for a given Java method. EJBInterfaceMethod element 948 is the doclet model type that represents annotation 807 in FIG. 8, since annotation 807 refers to login method 814 in FIG. 8.

On the other hand, annotation object 944 has a different tag handler key, EJBServiceTagHandler 954. EJBServiceTagHandler 954 identifies a different tag handler from EJBTagHandler 908 and 943 within the 'ejb' namespace. In addition, annotation object 944 identifies a different tag region holder, EJBServiceMethodTags 950, which defines a relationship named 'service-method' that is typed to EJBServiceMethod 952. This relationship has a multiplicity of one which indicates that there can only be one 'service-method' annotation tag within the 'ejb' namespace for a given Java method. EJBServiceMethod element 952 represents annotation 808 in FIG. 8. This example illustrates that multiple tag handlers may be registered with the same 'ejb' namespace and each tag handler may react to the same tag or a different set of tags within the registered namespace.

Thus, using the mechanism of the present invention, after annotations in a source file are processed, new or updated annotations are represented as corresponding doclet objects in the doclet model. The relationship names from the type, method, and field TagRegionHolders represent the valid annotation type, method, and field tags within a given namespace and the attribute names within the doclet metamodel elements represent the valid attribute tags of a given annotation tag type. Note that the annotation type tags for each relationship from the TagRegionHolder are represented as a doclet meta-model.

Figure 10:
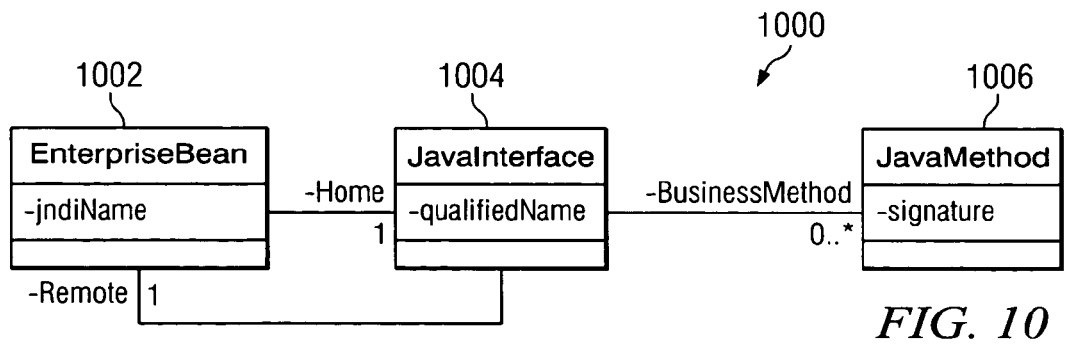
FIG. 10 is a diagram illustrating an exemplary semantic model in according with a preferred embodiment of the present invention.

Turning now to FIG. 10, a diagram illustrating an exemplary semantic model is depicted in accordance with a preferred embodiment of the present invention. As shown in FIG. 10, in this example implementation, after transformation is performed by the mechanism of the present invention, instances of the semantic model 1000 are generated, which includes enterprise Java™ bean 1002, Java™ interface 1004, and Java™ method 1006. These semantic objects are updated when doclet model changes are detected by the tag handlers.

Enterprise Java™ bean 1002 corresponds to EJBBean 914 in FIG. 9, which is an enterprise Java™ bean that has a JNDI-name of 'ejb/ejbs/LoginServiceHome.' Java™ interface 1004 is used to represent EJBHome 912 and EJBInterface 916 in FIG. 9, which are the home interface and the remote interface for the enterprise Java™ bean. Associated with Java™ interface 1004 is zero or more Java™ methods 1006. In the example of FIG. 9, there are two Java™ methods 1006, which include EJBInterfaceMethod 948 and EJBServiceMethod 952. The existence of EJBInterfaceMethod 948 indicates that the interface method should be made visible in the client interfaces of the enterprise Java™ bean.

Depending on the implementation, EJBServiceMethod 952 may be used to indicate that a service-oriented pattern should be generated for this particular method. Thus, there may be two tag handlers that are registered with the same 'ejb' namespace and one of the tag handlers only handles the service method.

Figure 11:
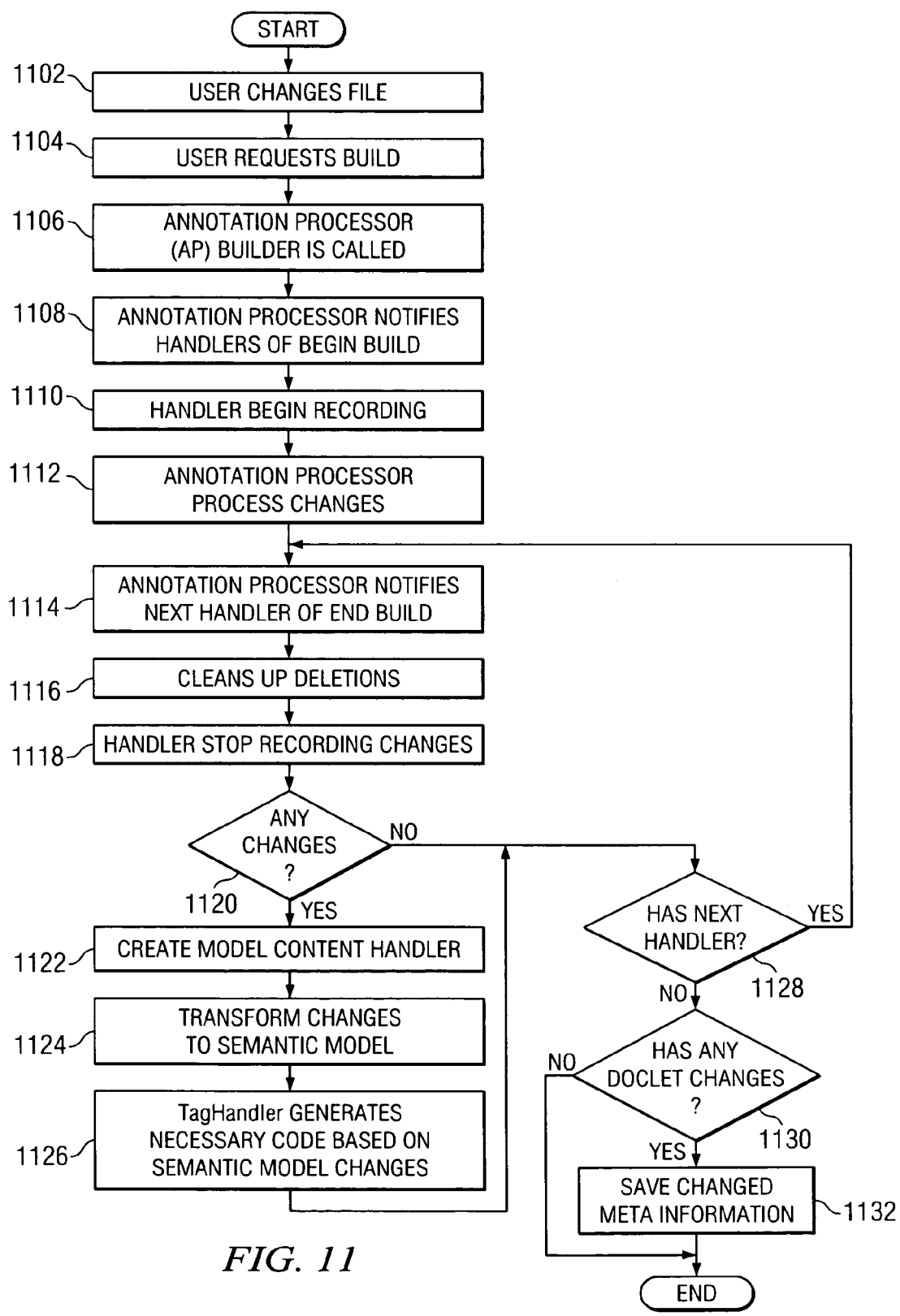
FIG. 11 is a flowchart of an exemplary process for incrementally processing program annotations in accordance with a preferred embodiment of the present invention.

Turning now to FIG. 11, a flowchart of an exemplary process for incrementally processing program annotations is depicted in accordance with a preferred embodiment of the present invention. This process is implemented by elements 604, 606, and 610 in FIG. 6.

As shown in FIG. 11, in this example implementation, the process begins when a user makes a change to at least one annotation within source file (step 1102). A user may add, remove, or update an annotation. This corresponds to a change to a '@namespace.tagname' region in the source file.

Next, the user saves changes to the annotations and initiates a build in the integrated development environment (step 1104). The build step includes launching any necessary builders, such as compilers, to react to changes made in the source files. One of the builders launched may be an annotation processor (step 1106), which is a special builder that reacts to changes made in the source files.

The annotation processor in turn notifies each tag handler registered with a given namespace that a build cycle has begun (step 1108). When each tag handler receives the notification from the annotation processor, the tag handler calls its own annotation change recorder to begin recording changes (step 1110). This step enables each tag handler to record changes made to the doclet model as annotations are processed. The doclet model includes doclet objects that are created or updated as changes to annotations are detected by the tag handler.

The annotation processor then continues to process each of the changed source files during the build cycle (step 1112). The processing of changed source files is described in further detail in FIG. 12. After processing is complete, the annotation processor signals to each tag handler, that the end of the build cycle has been reached (step 1114).

While changes are being recorded by each tag handler, the tag handler traverses each changed annotated source file and removes any deleted annotations from the doclet model (step 1116). The tag handler cleans up deletions by using the annotation change recorder to determine which of the doclet objects and attributes, corresponding to changed files, have not been processed. These doclet objects represent annotation properties or tags that no longer exist in the source file. The non-processed doclet objects or attributes are then removed from the doclet model.

In addition to non-processed doclet objects, the tag handler also cleans up deletions for deleted source files that had annotations. All doclet objects that correspond to the deleted source files are removed from the in-memory annotation source model, such that the doclet model reflects exactly the tags and tag attributes that are defined in the source files.

Once the deletions are cleaned up, the tag handler issues an end recording call to the annotation change recorder (step 1118). At this point, the annotation change recorder reconciles the changes by determining deleted doclet objects which are doclet objects that were being recorded but no longer exist in the source model. The annotation change recorder removes any changes where the changed value is the same as the original value, such that only added, deleted, and truly changed objects remain. The annotation tag handler then asks the annotation change recorder if any changes were made to the doclet model for this tag handler (step 1120).

If no changes are made to the doclet objects, the process continues to step 1128. Otherwise, the tag handler creates a model content handler (step 1122) to transform doclet model changes to the semantic model (step 1124). Step 1124 is described in further details in FIGS. 14A-D.

After transformation is complete, the tag handler may generate or update any necessary code based on semantic model changes that are made during transformation (step 1126) and continues to step 1128. At step 1128, the mechanism of the present invention determines if additional tag handlers are present for notification. If additional tag handlers are present, the process returns to step 1114.

If additional tag handlers are not present, the mechanism of the present invention determines if any doclet model changes were made during processing (step 1130). If no changes were made to the doclet model, the process terminates thereafter.

If changes are made to the doclet model, the in-memory source model and a linking model are serialized out to a state location of the integrated development environment (IDE) to save the changed metadata (step 1132). The models may be serialized out using any serialization format, such as extensible markup language (XML) metadata interchange (XMI). Each tag handler also has an opportunity to serialize out its doclet model if it is changed. This step is necessary in order to have a mechanism whereby the state is preserved from one session to the next within the IDE such that a full rebuild and reprocessing of all annotated files is not required when the system is restarted, thus maintaining the "incremental" ability to process only changed files on the next build. Thus, the process terminates thereafter.

Figure 12:
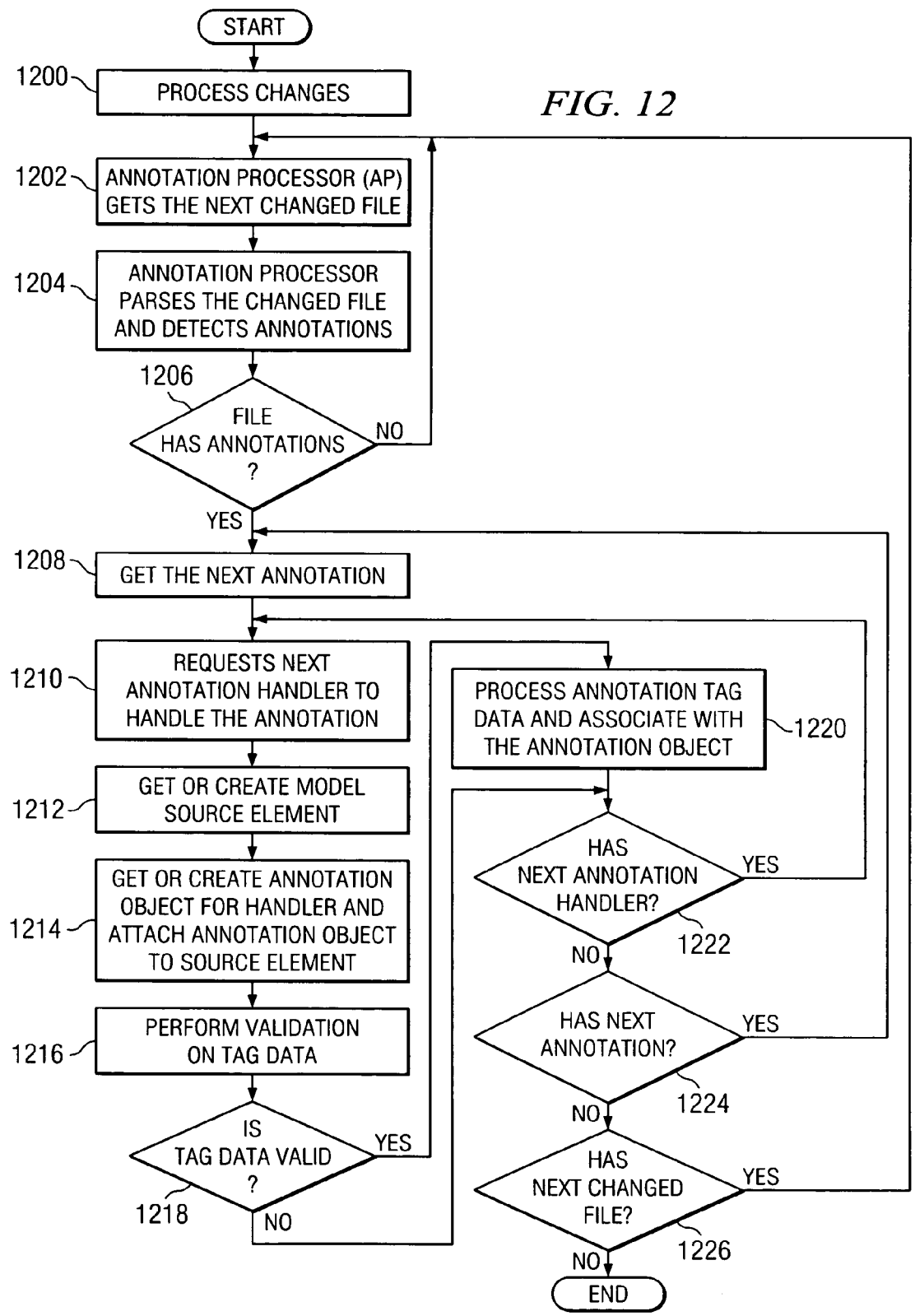
FIG. 12 is a flowchart of an exemplary process for processing changed source files in accordance with a preferred embodiment of the present invention.

Turning now to FIG. 12, a flowchart of an exemplary process for processing changed source files is depicted in accordance with a preferred embodiment of the present invention. This process describes step 1112 in FIG. 11 in further details.

As shown in FIG. 12, the process begins when the annotation processor begins to process changes (step 1200). The annotation processor then obtains the next changed source file during the build cycle (step 1202).

Next, the annotation processor parses the changed source file (step 1204). A determination is then made by the annotation processor as to whether the changed source file contains annotations (step 1206). If no annotation is contained in the changed source file, the process returns to step 1202 to retrieve the next changed source file.

If the changed source file contains annotations, the annotation processor retrieves the next annotation defined in the changed source file (step 1208) and requests a registered tag handler that handles this annotation (step 1210). The registered tag handler should correspond to the namespace of the annotation being processed.

When the registered tag handler is retrieved, the tag handler either locates or creates a modeled source element (step 1212). When locating an existing modeled source element, the tag handler must first ensure that any previously serialized state is loaded from the state location. The tag handler locates a modeled source element given a unique id derived from a source that owns the annotation, for example, the Java™ source file.

If no modeled source element is located, the tag handler creates a new modeled source element using the unique id from the source and caches the newly created modeled source element. The modeled source element is an annotation type, such as Annotation Type 710 in FIG. 7, annotation method, such as Annotation Method 714 in FIG. 7, or an annotation field, such as AnnotationField 712 in FIG. 7. These objects hold doclet instances that are created from the annotations being processed.

Once a modeled source element is created or located, the tag handler locates or creates an annotation object and attaches the annotation object to the modeled source element (step 1214). The annotation object is located using a unique key from the tag handler. An annotation object is a container for annotations from a given source, such as a given tag handler. Multiple annotation objects may be associated with a given modeled source element, since there may be more than one annotation tag belonging to multiple namespaces or multiple tag handlers for the same namespace.

If an annotation object is not located, a new annotation object may be created by associating a unique tag handler key that identifies a specific tag handler for the annotation. The new annotation object may then be attached to the modeled source element. When the annotation object is created or located, it is added to the annotation change recorder, such that changes to the annotation and its contents may be recorded.

After the annotation object is attached, the tag handler may perform special validations on annotation tag data (step 1216) and determine if the annotation tag data is valid (step 1218). The validations are beyond basic validations performed by the annotation processor, such as uniqueness of values or valid Booleans. The validations may be programmatic validations that may not be defined anywhere else. One example of such a validation is the case where an annotation tag may require one of two attributes but not both, for example, a 'name' or a 'match' attribute must be defined.

If annotation tag data is not valid, the process continues to step 1222, which means that the annotation tag data is not processed into the doclet model and thus no change is recorded. If the annotation tag data is valid, the tag handler processes annotation tag data and associates the data with the annotation object in the doclet model (step 1220) and continues to step 1222. This step is described in further details in FIG. 13.

At step 1222, the mechanism of the present invention determines if additional annotation tag handlers are registered for this namespace to handle this annotation tag (step 1222). If an additional tag handler is present, the process returns to step 1210 to retrieve the next annotation tag handler. Otherwise, the mechanism of the present invention determines if additional changed source files are present for processing (step 1226).

If additional changed source files are present, the process returns to step 1202 to retrieve the next changed source file. Otherwise, the process terminates thereafter.

Figure 13:
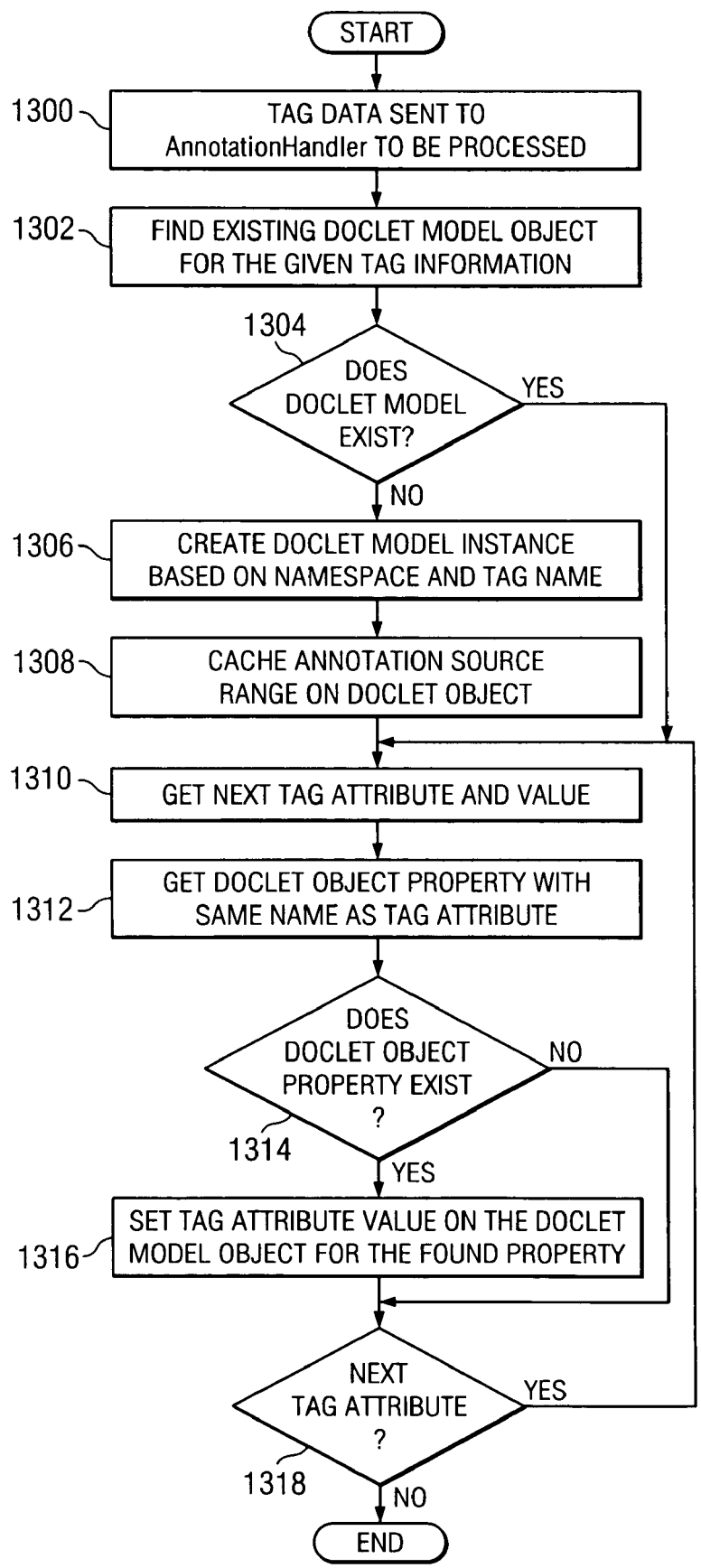
FIG. 13 is a flowchart of an exemplary process for processing annotation tag data in according with a preferred embodiment of the present invention.

Turning now to FIG. 13, a flowchart of an exemplary process for processing annotation tag data is depicted in accordance with a preferred embodiment of the present invention. This process describes step 1220 in FIG. 12 in further detail.

As depicted in FIG. 13, the process begins when annotation tag data is sent to an annotation tag handler to be processed (step 1300). Next, the tag handler locates an existing doclet object instance based on the region in the source file in which the annotation is detected (step 1302). The region may either be a type, a field, or a method. In order to locate the existing doclet object instance, the tag handler first locates the region object, such as TypeTags, MethodTags, or FieldTags, from the annotation object specific to the tag handler in the doclet model.

Once the region object is located, the existing object instance may be located on the region object based on its multiplicity in the doclet model for the property with the same name as the tag name. If the multiplicity of the property is one, there can only be one instance of the doclet object within this region object so the only existing object instance is used. If the multiplicity is more than one, the tag handler may indicate a unique property for the given doclet model type, for example, a 'name' property.

The value of the unique property is then used to detect an existing object instance in the region object. The existing object instance is detected by traversing the list of doclet model objects for the given property, and selecting an object instance that has the same value as the annotation tag data being processed for the unique property. However, if no unique property is defined for the given doclet model, the position within the source file may be used to detect an existing object instance in the region object. For example, if the annotation is second within a region with the same tag name, the existing object instance will be the second in the list of doclet object instances within the region object for the property with the same name as the tag name.

Thus, the tag handler makes a determination as to whether a doclet object instance exists (step 1304). If doclet object instance exists, the process continues to step 1310. If doclet object instance does not exist, a new doclet object instance may be created (step 1306).

The new doclet object instance is created by first creating a region object in the meta-model for the given tag name and namespace if one does not already exist. The newly created region object may then be added to the annotation object corresponding to the tag handler. From the region object, a meta-model property with the same name as the tag name is located and a new doclet model object instance may then be created, using the type of the property as described by the meta-model, and added to the region object using the property.

Once the doclet model object instance is created, a source range of the annotation in the source file is cached (step 1308) on the doclet object itself and the process continues to step 1310. The source range is cached such that when validation problems are detected, the annotation may be easily identified from a doclet object in order to place error or warning message markers in the source file.

At step 1310, tag attributes and values are processed for the given annotation tag. In order to process the tag attributes and values, the tag handler locates a doclet meta-model property on the existing doclet object instance that has the same name as the tag attribute (step 1312). Thus, the tag handler determines if a doclet meta-model property that has the same name as the tag attribute of the existing doclet object instance exists (step 1314). If the doclet meta-model property does not exist, the process continues to step 1318.

If the doclet meta-model property exists, the value of the property is set on the doclet object with the value of the annotation tag data being processed (step 1316) and the process continues to step 1318. At step 1318, the tag handler determines if additional tag attributes are present in the annotation. If additional tag attributes are present, the process returns to step 1310 to retrieve the next tag attribute and corresponding value. Otherwise, the process terminates thereafter.

Figure 14A:
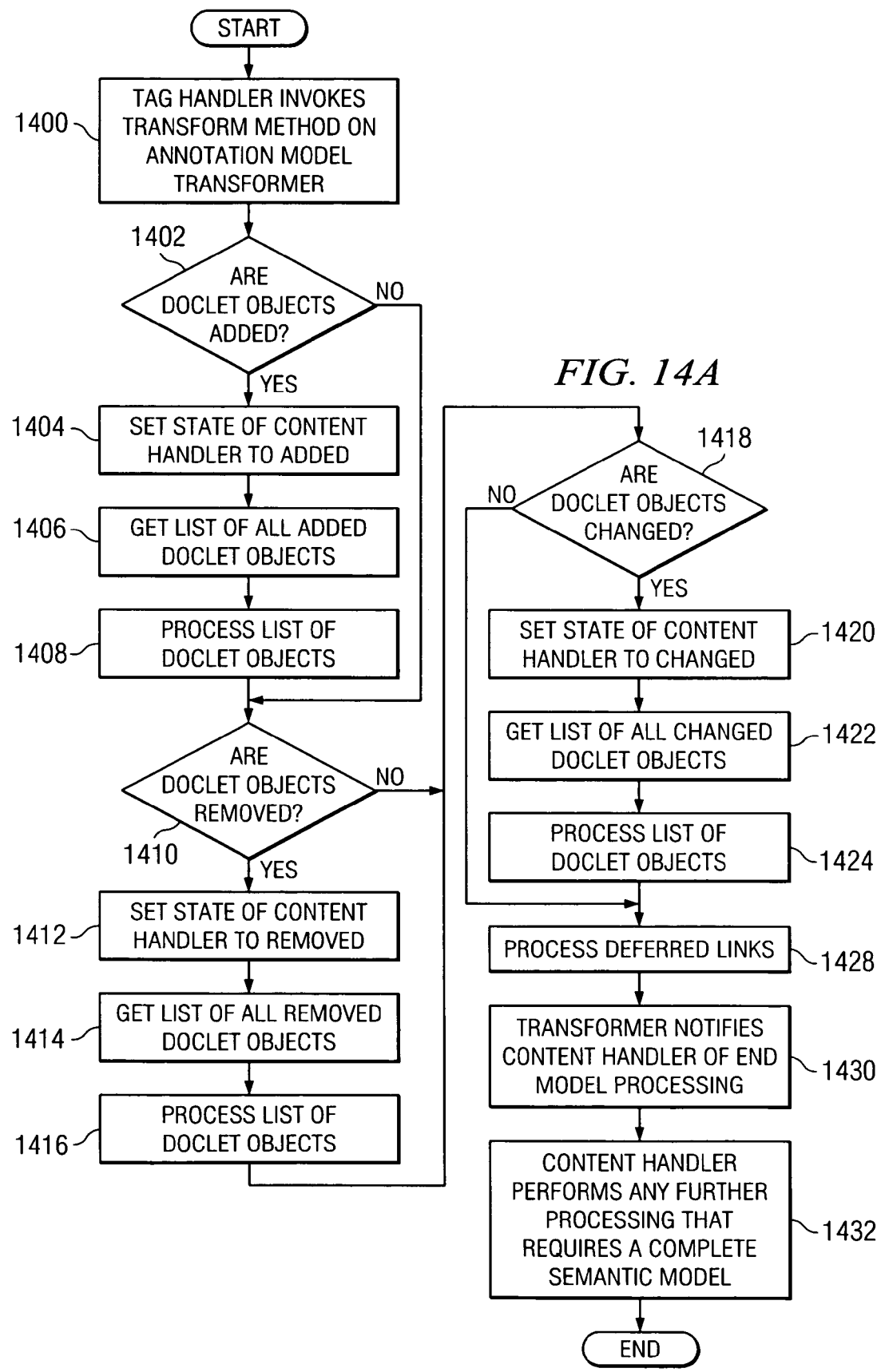
FIG. 14A is a flowchart of an exemplary process for transformation from doclet model to semantic model in accordance with a preferred embodiment.

Turning now to FIG. 14A, a flowchart of an exemplary process for transformation from doclet model to semantic model is depicted in accordance with a preferred embodiment. This process describes step 1124 in FIG. 11 in further details. As depicted in FIG. 14A, the process begins when the tag handler invokes a transform method on the annotation model transformer (step 1400). This step is performed after a model content handler is created and the model content handler is passed to the transformer during the transform invocation.

The annotation model transformer then requests from the annotation change recorder if added doclet objects are present (step 1402). If no added doclet objects are present, the process continues to step 1410.

If added doclet objects are present, the annotation model transformer sets the state of the model content handler to 'ADDED' (step 1404). The state of the model content handler is set, so that the model content handler may handle event notifications accordingly. That is, the event notifications may be the same for added and removed objects, but the model content handler knows the context of the notifications based on the current state. After the state is set, the content handler processes the list of added doclet objects (step 1408) and the process continues to step 1410.

At step 1410, the annotation model transformer then requests from the annotation change recorder if doclet objects were removed. If no doclet objects were removed, the process continues to step 1418. If doclet objects were removed, the annotation model transformer sets the state of the model content handler to 'REMOVED' (step 1412). After the state is set, the content handler processes the list of removed doclet objects (step 1416) and the process continues to step 1418.

At step 1418, the annotation model transformer then requests from the annotation change recorder if doclet objects were changed. If no doclet objects were changed, the process continues to step 1428. If doclet objects were changed, the annotation-model transformer sets the state of the model content handler to 'CHANGED' (step 1420). After the state is set, the content handler processes the list of changed doclet objects (step 1424) and the process continues to step 1428. Steps 1408, 1416, and 1424 are described in further detail in FIG. 14B.

At step 1428, the annotation model transformer processes deferred linkers. This step is described in further details in FIG. 14C. The annotation model transformer then notifies the model content handler of end model processing (step 1430). Finally, the model content handler performs any final processing that requires the finalization of the semantic model (step 1432) based on the changes to the doclet model. Examples of final processing include validations, searching for dangling references, or marking generated artifacts as dirty due to model changes. Thus, the transformation is complete and the process terminates thereafter.

Figure 14B:
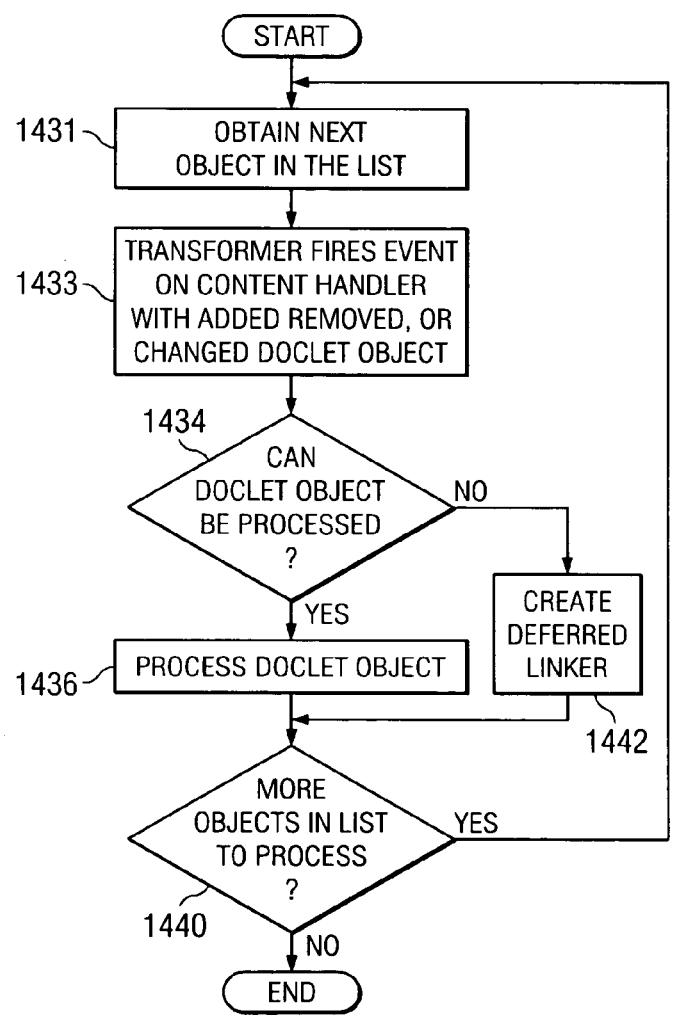
FIG. 14B is a flowchart of an exemplary process for processing a list of doclet objects in accordance with a preferred embodiment of the present invention.

Turning now to FIG. 14B, a flowchart of an exemplary process for processing a list of doclet objects is depicted in accordance with a preferred embodiment of the present invention. This process describes steps 1408, 1416, and 1424 in FIG. 14A in further detail. As shown in FIG. 14B, the process begins when the annotation model transformer iterates the list of doclet objects to obtain the next object in the list (step 1431).

Next, the annotation model transformer sends an event to the model content handler with the added, removed, or changed object (step 1433). The model content handler then determines if the doclet object may be processed (step 1434). Some doclet objects may not be processed until other dependent doclet objects are processed. If the doclet object can be processed before other doclet objects are processed, the model content handler processes the doclet object (step 1436) and the process continues to step 1440. Step 1436 is described in further details in FIG. 14D.

However, if the doclet object may not be processed, the model content handler creates a deferred linker (step 1442) and the process continues to step 1440. The deferred linker includes the doclet object that needs to be processed as well as a block of executable code that is deferred until all doclet objects are processed. This block of executable code is basically code that would have been run if all dependent doclet objects were already processed.

At step 1440, the annotation model transformer determines if additional doclet objects are present in the list. If additional doclet objects are present, the process returns to step 1430 to retrieve the next object in the list. Otherwise, the process terminates thereafter.

Figure 14C:
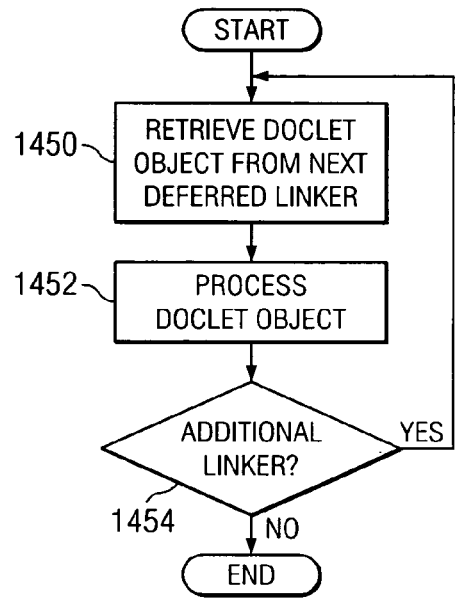
FIG. 14C is a flowchart of an exemplary process for processing deferred linkers in accordance with a preferred embodiment of the present invention.

Turning now to FIG. 14C, a flowchart of an exemplary process for processing deferred linkers is depicted in accordance with a preferred embodiment of the present invention. This process describes step 1428 in FIG. 14A in further detail. As depicted in FIG. 14C, the process begins when the doclet object is retrieved by the model content handler from the next deferred linker (step 1450). Next, the model content handler processes the doclet object (step 1452). This step is also described in further detail in FIG. 14D.

Once the doclet object is processed, the model transformer determines if additional deferred linkers are present for processing (step 1454). If additional deferred linkers are present, the process returns to step 1450 to retrieve the next doclet object. Otherwise, the process terminates thereafter.

Figure 14D:
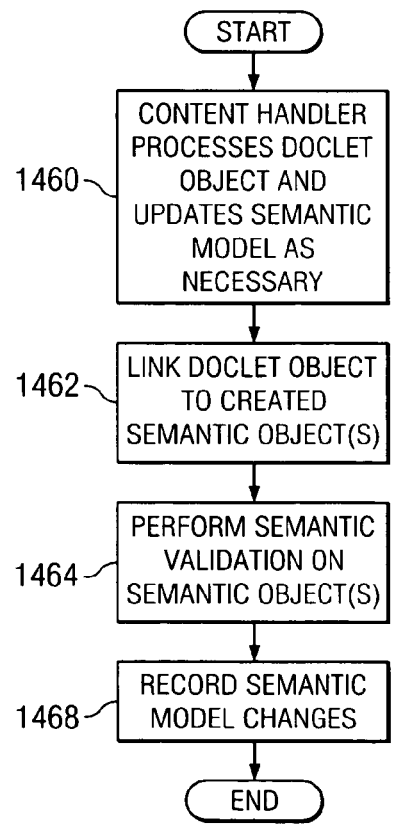
FIG. 14D is a flowchart of an exemplary process for processing a doclet object in accordance with a preferred embodiment of the present invention.

Turning now to FIG. 14D, a flowchart of an exemplary process for processing a doclet object is depicted in accordance with a preferred embodiment of the present invention. This process describes step 1436 in FIG. 14B and step 1451 in FIG. 14C in further detail. As depicted in FIG. 14D, the process begins when the model content handler updates the semantic model as necessary depending on the modification (step 1460). The model content handler performs the semantic model update based on the state that is set by the annotation model transformer.

For example, if the state is 'ADDED,' the model content handler creates a new semantic object and adds the object to the semantic model. Since it is not necessarily a one-to-one relationship between the doclet object and the semantic object, the model content handler may update an existing semantic object in the semantic model instead of adding a new semantic object to the semantic model. If the state is 'REMOVED,' the model content handler removes the semantic object from the semantic model. If the state is 'CHANGED,' the model content handler updates the semantic object in the semantic model.

In addition, the model content handler returns the semantic model object that was created from the process event notification from the annotation model transformer. The annotation model transformer creates a link between the doclet object being handled and the newly created semantic object (step 1462). The link serves a purpose of programmatic navigation between the semantic objects and the doclet objects. In particular, the link is necessary for validation. The linking mechanism is serializable such that this state can be saved and retrieved when the development environment is shutdown or restarted.

After the semantic model is updated, the model content handler may perform semantic validation on semantic objects (step 1464). If a warning or error occurs during validation, corresponding doclet objects may be derived from the link. Consequently, annotation tag data ranges from the source file may be determined using the cached source range on doclet objects. With the source range, the integrated development environment may place a marker at the location of the annotation in the source file to indicate the error or warning.

Finally, changes to the semantic model are recorded for future processing by the tag handler (step 1468). The tag handler may use this information to generate, remove, or update code or internal models as necessary. Thus, the process terminates thereafter.

In this manner, the present invention processes annotations in source files incrementally by representing annotations in an in-memory source and doclet model and tracking changes to annotations during processing. After processing is complete, changes to the doclet model are transformed to the semantic model. In this way, the semantic model is incrementally updated only as annotations change. In addition, changes to all three models are persisted, such that complete annotation state may be restored if the development environment is shutdown or restarted.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for incrementally processing program annotations, the method comprising:
    obtaining at least one changed source file:
    detecting at least one annotation in the at least one changed source file, wherein the at least one annotation is changed in the at least one changed source file;
    loading into a memory of the data processing system a previously serialized state from a state location:
    recording changes of the at least one annotation in a source model of the previously serialized state, wherein an annotation recorder reconciles the recorded changes to remove a change value having a same value as an original value, thereby leaving only added, deleted and actual changed objects to form recorded changes; and
    processing by the data processing system, only the recorded changes into a doclet model to form a set of incremental changes in the doclet model, wherein the set of incremental changes contains one or more changes.

2. The method of claim 1, further comprising:
    if the set of incremental changes is made to the doclet model, transforming the set of incremental changes in the doclet model to a semantic model; and
    persisting the source model, the doclet model, the semantic model, and links between the doclet model and the semantic model to the state location.

3. The method of claim 1, wherein the at least one annotation is changed by a user and wherein the detecting step comprises:
    detecting a request for a build from the user.

4. The method of claim 1, wherein the processing step comprises:
    invoking an annotation processor to retrieve the at least one changed source file;
    parsing the at least one changed source file to retrieve the at least one annotation; and
    invoking at least one tag handler to process the at least one annotation, wherein the at least one tag handler is registered for a namespace of the at least one annotation.

5. The method of claim 4, wherein the at least one tag handler processes the at least one annotation by:
    locating a source model element in the source model based on a unique identifier of a source that owns the at least one annotation; and
    if the source model element is not located, creating a new source model element in the source model using the unique identifier.

6. The method of claim 5, wherein the source model element holds instances of doclet objects in the doclet model created from the at least one annotation.

7. The method of claim 5, further comprising:
    locating at least one annotation object in the doclet model based on the source model element;
    if the at least one annotation object is not located in the doclet model, creating a new annotation object in the doclet model by associating a unique key identifying the at least one tag handler; and
    associating the new annotation object of the doclet model to the source model element in the source model.

8. The method of claim 7, wherein the source model element includes one or more annotation objects, and wherein each annotation object holds doclet model objects for the at least one tag handler, wherein each of the at least one tag handler is registered with a namespace and each of the one or more annotation objects may be contributed to by a different one of the at least one tag handler.

9. The method of claim 7, further comprising:
    adding the at least one annotation object to an annotation change recorder for tracking changes;
    performing validations on tag data of the at least one annotation object with reference to the namespace of the at least one annotation; and
    processing the tag data.

10. The method of claim 9, wherein the validations include determining if syntax of the at least one annotation object is correct, wherein the syntax of the at least one annotation is correct if the at least one annotation includes a specific attribute.

11. The method of claim 1, wherein the recording step comprises:
invoking an annotation change recorder to record changes to the at least one annotation;
identifying doclet objects and attributes that are not processed, to form non-processed doclet objects wherein the doclet objects and attributes of the non-processed doclet objects represent properties and tags of the at least one annotation that no longer exist in the at least one changed source file; and
removing the non-processed doclet objects from the doclet model and clearing attribute values from doclet objects that were processed, wherein the attributes corresponding to the attribute values were not processed.

12. The method of claim 11, further comprising:
determining if the at least one changed source file is deleted; and
removing doclet objects corresponding to the at least one changed source file if the at least one changed source file is deleted.

13. The method of claim 9, wherein the processing step for processing the tag data comprises:
sending the tag data to the at least one tag handler, wherein the tag data includes tag attributes and corresponding values.

14. The method of claim 13, further comprising:
locating an existing doclet object instance for the tag data;
if the existing doclet object instance is not located, creating a new doclet object instance; and
associating the new doclet object instance with the at least one annotation object.

15. The method of claim 14, wherein the locating step comprises:
locating a region object from the at least one annotation object, wherein the region object represents the region in which the at least one annotation object is located in the at least one changed source file; and
locating the existing doclet object instance from the region object based on multiplicity of the existing doclet object instance in the doclet model for a property with a same name as a tag name of the at least one annotation object.

16. The method of claim 15, wherein second locating step comprises:
locating an existing doclet object instance if the multiplicity of the existing doclet object instance is one;
locating an existing doclet object instance based on a unique meta-model property if the multiplicity of the existing doclet object instance is more than one, wherein the unique property is defined by the at least one tag handler; and
locating an existing doclet object instance based on a position in the at least one changed source file if no unique meta-model property is defined, wherein the existing doclet object instance is the doclet object instance in a list of doclet objects of the region object for a property with a same name as a tag name of the at least one annotation object.

17. The method of claim 14, where in the creating step comprises:
locating a property from the region object with a same name as a tag name of the at least one annotation object; and
creating a new doclet object instance using a type of a doclet meta-model property.

18. The method of claim 17, further comprising:
caching a range of the at least one annotation in the at least one changed source file with the new doclet object instance.

19. The method of claim 14, further comprising:
processing the tag attributes and corresponding values, wherein the processing step comprises:
retrieving at least one tag attribute and corresponding value from the at least one changed source file;
locating a doclet meta-model property that has a same name as name of the at least one tag attribute; and
setting value of the existing doclet object instance with value of the doclet meta-model property.

20. The method of claim 2, wherein the transforming step comprises:
creating a model content handler for a given namespace of the at least one annotation;
retrieving a list of modified doclet objects from the annotation change recorder; and
processing a list of modified doclet objects retrieved from the annotation change recorder in the model content handler.

21. The method of claim 20, further comprising:
processing a list of added objects retrieved from the annotation change recorder in the model content handler, if the list of modified doclet objects includes added objects;
processing a list of removed objects in the model content handler, if the list of modified doclet objects includes removed objects;
processing a list of changed objects in the model content handler, if the list of modified doclet objects includes changed objects; and
processing a list of deferred linkers in the model content handler.

22. The method of claim 21, wherein the processing step for processing a list of added objects comprises:
notifying the model content handler of the list of modified doclet objects;
determining if each of the list of modified doclet objects can be processed; if a modified doclet object can be processed, processing each of the list of modified doclet objects; and
if a modified doclet object cannot be processed, creating a deferred linker for the modified doclet object.

23. The method of claim 22, wherein the processing step for processing a list of removed objects comprises:
notifying the model content handler of the list of removed objects; and
repeating the determining step, the processing step and the creating step to process the list of removed objects.

24. The method of claim 22, wherein the processing step for processing a list of changed objects comprises:
notifying the model content handler of the list of changed objects; and
repeating the determining step, the processing step and the creating step to process the list of changed objects.

25. The method of claim 22, wherein the processing step for processing each of the list of modified doclet objects comprises:
if the list of modified objects includes added objects, creating a new semantic object in the semantic model; and
creating a link between a doclet object from the list and the new semantic object.

26. The method of claim 25, further comprising:
if the list of modified objects includes removed objects, removing a semantic object from the semantic model using a link between the semantic object and a doclet object from the list.

27. The method of claim 26, further comprising:
if the list of modified objects includes changed objects, updating a semantic object in the semantic model using a link between the semantic object and a doclet object from the list.

28. The method of claim 27, further comprising:
performing semantic validation in the semantic model;
if a problem is detected, deriving a doclet object in the doclet model based on the link between the semantic object and a doclet object from the list;
deriving a source range from the source model using the derived doclet object; and
placing a problem marker in the at least one changed source file to indicate the problem.

29. The method of claim 2, wherein the persisting step comprises:
serializing the source model, the doclet model, the semantic model, and links between the doclet model and the semantic model to the state location in a data exchange format, wherein the data exchange format includes an extensible markup language metadata interchange format.

30. The method of claim 9, wherein validations include excluding non-conforming tag data from the doclet model.

31. The method of claim 1, wherein the source model and the doclet model are implemented in a same meta-data model.

32. A data processing system for incrementally processing program annotations, the data processing system comprising:
a bus,
a memory connected to the bus, wherein the memory contains computer executable instructions;
a processor connected to the bus, wherein the processor executes the computer executable instructions to direct the data processing system to:
obtain at least one changed source file:
detect at least one annotation in at the least one changed source file, wherein the at least one annotation is a changed annotation in the at least one changed source file;
load into the memory a previously serialized state from a state location;
record changes of the changed annotation incrementally into a source model of the previously serialized state, wherein an annotation recorder reconciles the recorded changes to remove a change value having a same value as an original value, thereby leaving only added, deleted and actual changed objects to form recorded changes; and
process only the recorded changes into a doclet model to form a set of incremental changes in the doclet model, wherein the set of incremental changes contains one or more changes.

33. The data processing system of claim 32, wherein the processor executes the computer executable instructions to direct the data processing system further comprises:
if the set of incremental changes is made to the doclet model, transform the set of incremental changes in the doclet model to a semantic model; and
persist the source model, the doclet model, the semantic model, and links between the doclet model and the semantic model to the state location.

34. The data processing system of claim 32, wherein the processor executes the computer executable instructions to direct the data processing system to process only the recorded changes further comprises:
invoke an annotation processor to retrieve the at least one changed source file;
parse the at least one changed source file to retrieve the at least one annotation; and
invoke at least one tag handler to process the at least one annotation, wherein the at least one tag handler is registered for a namespace of the at least one annotation.

35. The data processing system of claim 32, wherein the processor executes the computer executable instructions to direct the data processing system to record further comprises:
invoke an annotation change recorder to record changes to the at least one annotation;
identify doclet objects and attributes that are not processed, to form non-processed doclet objects wherein the doclet objects and attributes of the non-processed doclet objects represent properties and tags of the at least one annotation that no longer exist in the at least one changed source file; and
remove the non-processed doclet objects from the doclet model and clear attribute values from doclet objects that were processed, wherein the attributes corresponding to the attribute values were not processed.

36. The data processing system of claim 33, wherein the processor executes the computer executable instructions to direct the data processing system to transform further comprises:
creating create a model content handler for a given namespace of the at least one annotation;
retrieve a list of modified doclet objects from the annotation change recorder; and
process the list of modified doclet objects retrieved from the annotation change recorder in the model content handler.

37. The data processing system of claim 33, wherein the processor executes the computer executable instructions to direct the data processing system to persist further comprises:
serialize the source model, the doclet model, the semantic model, and links between the doclet model and the semantic model to the state location in a data exchange format, wherein the data exchange format includes an extensible markup language metadata interchange format.

38. A computer program product for incrementally processing program annotations, the computer program product comprising:
a computer readable recordable-type medium having computer executable instructions stored thereon, the computer executable instructions comprising:
first instructions for obtaining at least one changed source file;
second instructions for detecting at least one annotation in the at least one changed source file, wherein the at least one annotation is a changed annotation in the at least one changed source file;
third instructions for loading into a memory of a computer a previously serialized state from a state location:
fourth instructions for recording changes of the at least one annotation in a source model of the previously serialized state, wherein an annotation recorder reconciles the recorded changes to remove a change value having a same value as an original value, thereby leaving only added, deleted and actual changed objects to form recorded changes; and fifth instructions for processing, by the computer, only the recorded changes into a doclet model to form a set of incremental changes in the doclet model, wherein the set of incremental changes contains one or more changes.

39. The computer program product of claim 38, further comprising:
if the set of incremental changes is made to the doclet model, sixth instructions for transforming the set of incremental changes in the doclet model to a semantic model; and
seventh instructions for persisting the source model, the doclet model, the semantic model, and links between the doclet model and the semantic model to the state location.

40. The computer program product of claim 38, wherein the fifth instructions comprises:
first sub-instructions for invoking an annotation processor to retrieve the at least one changed source file;
second sub-instructions for parsing the at least one changed source file to retrieve the at least one annotation; and
third sub-instructions for invoking at least one tag handler to process the at least one annotation, wherein the at least one tag handler is registered for a namespace of the at least one annotation.

41. The computer program product of claim 38, wherein the fourth instructions for recording changes further comprises:
first sub-instructions for invoking an annotation change recorder to record changes to the at least one annotation;
second sub-instructions for identifying doclet objects and attributes that are not processed to form non-processed doclet objects, wherein the doclet objects and attributes of the non-processed doclet objects represent properties and tags of the at least one annotation that no longer exist in the at least one changed source file; and
third sub-instructions for removing the non-processed doclet objects from the doclet model and clearing attribute values from doclet objects that were processed, wherein the attributes corresponding to the attribute values were not processed.

42. The computer program product of claim 39, wherein the sixth instructions comprises:
first sub-instructions for creating a model content handler for a given namespace of the at least one annotation;
second sub-instructions for retrieving a list of modified doclet objects from the annotation change recorder; and
third sub-instructions for processing a list of modified doclet objects retrieved from the annotation change recorder in the model content handler.

43. The computer program product of claim 39, wherein the seventh instructions comprises:
first sub-instructions for serializing the source model, the doclet model, the semantic model, and links between the doclet model and the semantic model to the state location in a data exchange format, wherein the data exchange format includes an extensible markup language metadata interchange format.

* * * * *